United States Patent [19]
Toth et al.

[11] 3,974,933
[45] Aug. 17, 1976

[54] EXPLOSION PROOF AND WATERTIGHT ENCLOSURE WITH INSPECTABLE MEANS FOR VERIFYING VALIDITY OF RECLOSURE

[75] Inventors: Maria Toth, Terryville; Frank L. Browne, Bristol, both of Conn.

[73] Assignee: General Signal Corporation, Rochester, N.Y.

[22] Filed: Nov. 14, 1975

[21] Appl. No.: 631,980

[52] U.S. Cl. .............................. 220/3.8; 220/3.94; 220/88 R; 220/327; 174/50
[51] Int. Cl.² .......................................... H02G 3/08
[58] Field of Search .................. 220/3.8, 3.94, 88 R, 220/327; 174/17 UA, 50, 65 R

[56] References Cited
UNITED STATES PATENTS

| | | | |
|---|---|---|---|
| 3,317,072 | 5/1967 | Zavertnik et al. ............... | 220/3.8 |
| 3,430,799 | 3/1969 | Maier ................................ | 220/3.94 |
| 3,724,706 | 4/1973 | Slocum ............................. | 220/3.8 |

Primary Examiner—George T. Hall
Attorney, Agent, or Firm—Milton E. Kleinman; George W. Killian

[57] ABSTRACT

When electrical equipment is used in a hazardous atmosphere, it must be enclosed in an explosion proof enclosure so an electrical spark cannot cause a fire or explosion. The present invention provides a means for assuring that an explosion proof enclosure which has been opened for inspection, repair or adjustment of the electrical apparatus is restored to its original condition. To this end, a visually inspectable locking means is provided. The locking means can be engaged only when the enclosure compartment and its associated cover are restored to their original explosion proof relationship. The locking means does not exert any distorting force on the mating threads of the enclosure.

14 Claims, 6 Drawing Figures

EXPLOSION PROOF AND WATERTIGHT ENCLOSURE WITH INSPECTABLE MEANS FOR VERIFYING VALIDITY OF RECLOSURE

BACKGROUND OF THE INVENTION

Because the opening and/or closing of electrical switch contacts may produce a spark, switches used in hazardous atmospheres are enclosed in explosion proof containers. Such containers are often exposed to severe physical conditions and, therefore, must be exceptionally rugged. For example, the switch enclosing containers may be subjected to severe vibrations from explosives used in mining operations. The enclosures may be hit by falling debris or be manipulated by hand tools such as shovels and pick axes. In addition, water tight seals are frequently required. The container must retain its explosion proof and water tight seal under adverse conditions and, furthermore, a simple, easy and quick visual inspection should show that the container is properly reassembled to its original factory setting. In order for a container to be certified as acceptable for use in mining operations, the container must meet certain minimum requirements as set forth in a booklet published by the Bureau of Mines of the U.S. Department of the Interior and entitled, "Electric Motor-Driven Mine Equipment and Accessories."

SUMMARY OF THE INVENTION

There is disclosed an explosion proof and water tight container for electrical equipment for use in hazardous locations. More particularly, there is disclosed a means for quickly and easily ascertaining, by visual inspection, that the container has been closed to a setting which corresponds with the initial factory setting thereby providing assurance that it has the required explosion proof and water tight characteristics. To this end, there is provided a compartment section and a cover which is secured to the container with at least five mating threads. To assure that the cover is secure, there is provided a selectively engageable means which is engageable only when the cover and container are in a predetermined relationship which assures the desired seal. When the selectively engageable means are engaged, the amount of relative rotation between the cover and the container is severely restricted. In a typical embodiment there is provided a slot in the cover with the slot parallel to the cover threads. When the cover is turned to the proper position, a portion of a bolt can be engaged with the slot in the cover. If the cover has not been screwed on far enough, the slot will be above the bolt and engagement will not be possible. In order to avoid applying any distorting force between the threads of the cover and the container, the bolt which goes into the slot in the cover has a shoulder which abuts its support before the bolt bottoms in the slot in the cover. In an alternate structure, the female portion of the container could have an appropriately positioned and proportioned slot to provide access to a threaded hole in the male member so that a set screw could be inserted and limit relative rotation between the container members.

In summary, the invention provides for an explosion proof and water tight enclosure for electrical equipment. The enclosure includes a compartment section and a cover which are joined together by mating threads. A gasket disposed in sealing arrangement between the compartment and the cover provides the water tight seal when the gasket is subjected to an appropriate compression in response to the cover having been turned a sufficient number of times with respect to the compartment section. To provide a visual indication that the cover is in the appropriate position, locking means engageable with the cover and compartment are provided that will lock only when the cover and compartment are in the desired sealing relationship.

It is an object of the invention to provide a new and improved container for use in hazardous environments.

It is another more specific object of the invention to provide a container which may be easily and readily inspected to determine that its components have been assembled to provide the desired seal.

It is another object of the invention to provide a locking means for a container which is engageable only when the cover and container are properly assembled to provide the desired sealing.

BRIEF DESCRIPTION OF THE DRAWING

In describing the invention, reference will be made to the various figures of the drawing in which three digit reference numbers have been used with the first digit corresponding to the figure number. Elements of the various figures which differ only in the first digit have similar functions. In the drawing.

DESCRIPTION OF THE PREFERRED EMBODIMENT

Figure 4:
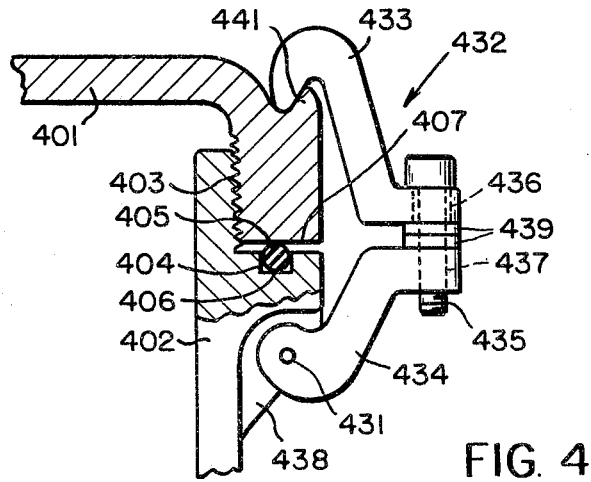
FIG. 4 is a partial cross section view of another embodiment of the invention.
Figure 5:
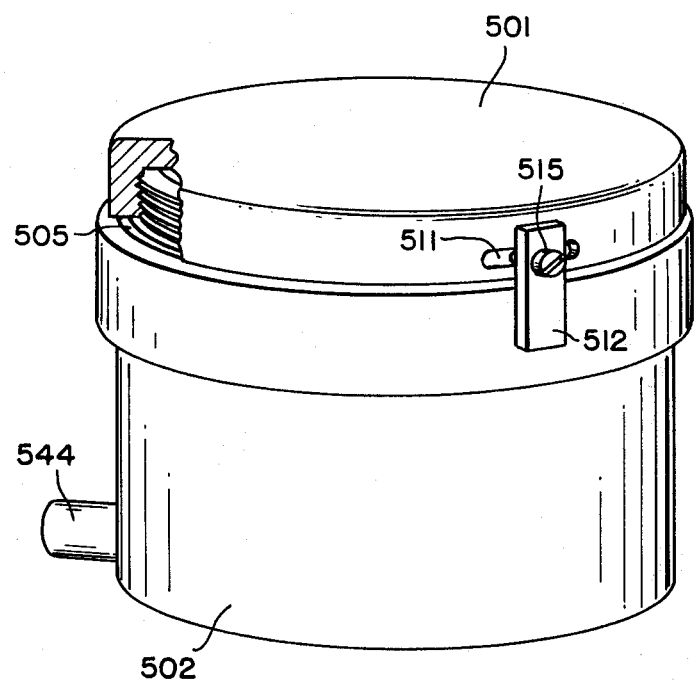
FIG. 5 is a simplified three dimensional view of an enclosure which incorporates one embodiment of the invention.

Considering now more specifically FIG. 5, there will be seen a simplified three dimensional view of an explosion proof and water tight enclosure which may be used for enclosing electrical equipment and which incorporates one embodiment of the invention. Various embodiments of the invention are illustrated in FIGS. 1 through 4 which constitute only a portion of the overall enclosure.

Figure 1:
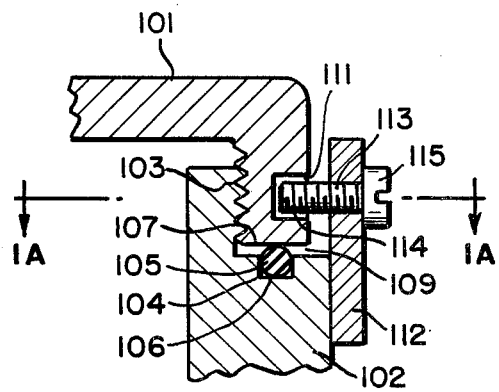
FIG. 1 is a partial cross section view of one embodiment of the invention.

Considering now more specifically FIG. 1, there will be seen a cross-sectional view of one embodiment of the invention wherein 101 represents a portion of the cover of the enclosure. 102 represents a portion of the compartment section of the enclosure. The cover 101 and the compartment 102 have a minimum of five full threads 103 which mate one with the other so that they may be screwed together in mating relationship in response to relative rotational motion. Included within a retaining groove 104 of the compartment 102 is a gasket 105 which provides the water tight seal between the interior and exterior of the enclosure. As will be obvious to those skilled in the art of fabricating enclosure, the gasket supporting base 106 of the groove 104 should be in a plane which is parallel to the anvil plane 107 of the cover 101. With this relationship between the base 106 and the anvil plane 107, a gasket 105 which has a uniform cross section will be contacted with uniform pressure as the cover 101 is turned down onto the compartment 102. The amount of pressure applied to the gasket 105 to provide the desired water tight seal between the interior and exterior of the enclosure may vary depending upon various factors including; the anticipated maximum pressure differential between the interior and exterior of the enclosure, the compressability of the gasket 105, the material of which the gasket 105 is made and other physical factors known to those experienced in the art.

Figure 1A:
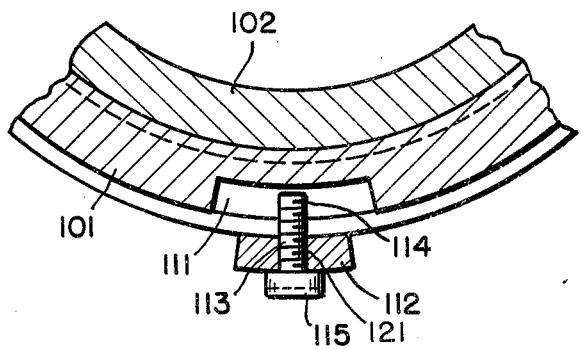
FIG. 1A is a partial cross section view taken on the plane 1A—1A of FIG. 1.

In accordance with the invention, when the cover 101 and the compartment 102 were originally assembled, and a satisfactory seal obtained between the interior and exterior of the enclosures, a slot 111 was cut into the cover 101. As may be seen by considering FIG. 1 and FIG. 1A together, the slot 111 is concentric with the threads 103 and extends from its beginning to its end over a relatively small portion of the circumference of the cover 101. For example, in a practical application, the diameter of the cover 101 may be of the order of ten inches and the length of the slot 111 be of the order of one inch. Attached to the compartment 102 is a bracket 112 which is supported by the compartment 102 and which is threaded to hold a bolt 113 whose end 114 can extend into the slot 111 when the head 115 of the bolt 113 is in contact with the bracket 112. As may be best seen in FIG. 1, the width of the slot 111, in the direction parallel to the axis of the threads 103, is only slightly greater than the diameter of the bolt 113. With the arrangement and physical limitations enumerated, it will be evident that the bolt 113 cannot be inserted, and its end 114 engaged with a portion of the slot 111, unless there is a very specific and predetermined relationship between the cover 101 and the compartment 102. Obviously, the angular relationship of the cover 101 must be such that the slot 111 is in alignment with the bolt 113. But, in addition, because the slot 111 has a width which is only slightly greater than that of the bolt 113, the bolt 113 will not be able to engage the slot 111 if the cover 101 is turned one full revolution from its ideal position. That is, if the cover 101 is turned one full revolution from its ideal position so that the slot 111 is moved upward with respect to the bolt 113, the engagement between the bolt 113 and the slot 111 is not possible. In order to satisfy this requirement, the clearance between the bolt 113 and the upper and lower limits of the slot 111 must be less than the pitch of the threads 103. The threads 103 should be single threaded, not multiple threaded. To protect the bolt 113 against possible loss, the end may be peened to prevent removal.

With the structure described, it will be evident that it is possible to remove the cover 101 from the compartment section 102 and restore it to a setting that corresponds with the original relationship between the cover 101 and the compartment 102.

Figure 2:
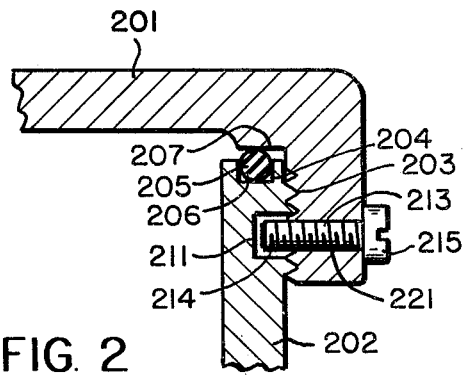
FIG. 2 is a partial cross section view of another embodiment of the invention.

Considering now more specifically FIG. 2, there will be seen another embodiment of the invention which differs from the structure of FIG. 1 in two major respects. First, the gasket 205 is above the bolt 213; and second, the slot 211 is concealed from external view. In this structure, a bracket is not required as the cover 201 includes a threaded hole 221 for supporting the bolt 213 which extends into the slot 211 when the cover 201 is in the required position relative to the compartment 202. In order to facilitate alignment of the bolt 213 with the slot 211, a mark should be placed on the exterior of the compartment section 202 to indicate the boundaries of the slot 211. Then when the cover 201 is turned to an angular position, wherein the bolt 213 aligns with the marks indicating the boudaries of the slot 211, the bolt 213 may be turned to see if it will enter the slot 211. If the bolt 213 will not enter the slot 211, it is an indication that another complete revolution of the cover 201 should be made with respect to the compartment section 202. Eventually, the bolt end 214 and the slot 211 will be in alignment and the bolt 213 can be turned until the head 215 may be brought flush with the exterior surface of the cover 201. At this time, the anvil plane 207 of the cover 201 will make contact with the gasket 205 and provide the required seal between the interior and exterior of the enclosure. As with the corresponding elements in FIG. 1, the base 206 of the groove 204 should be parallel to the anvil plane 207 in order to assure uniform contact with, and compression of, the gasket 205.

As previously indicated, identifying numbers in the various figures which differ only in their first digit relate to elements which correspond one with the other in function and purpose.

Figure 3:
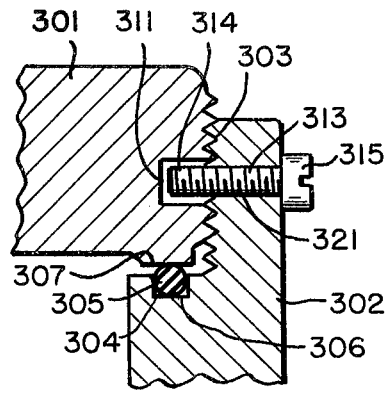
FIG. 3 is a partial cross section view of yet another embodiment of the invention.

Considering now more specifically FIG. 3, there will be seen another embodiment of the invention which corresponds with FIG. 1 in that the bolt 313 is above the gasket 305 and corresponds with FIG. 2 in that the slot 311 is concealed from view. The major distinction between FIG. 3 and FIGS. 1 and 2 is that the cover 301 has male threads while the compartment section 302 has female threads. To facilitate assembly with this embodiment, marks should be placed on the top of the cover 301 to indicate the boundaries of the slot 311. When the slot 311 is in alignment with the bolt 313 so that the bolt 313 can be turned until the bolt head 315 contacts the exterior surface of the compartment section 302, the cover 301 and compartment section 302 have been restored to the original setting for providing the required seal between the interior and exterior of the enclosure.

It will be evident that the bolt 213 or 313 may be peened to prevent its removal from the threaded member 201 or 302, respectively. If this feature is not desired, the male member (202 of FIG. 2 or 301 of FIG. 3) may be threaded to accommodate bolt 221 or 321. In this case, the female member (201 of FIG. 2 or 302 of FIG. 3) would have an appropriately aligned and proportioned slot. Also with this variation, the bolt 213 or 313 would not normally include a head. If a head is included, the bolt length should be such that the head cannot contact the female member. This prevents the bolt from exterting any distorting force on the threads 203 or 303.

Considering now more specifically FIG. 4, there will be seen an embodiment which differs substantially from those shown in FIGS. 1 through 3, although there is no difference in objectives or functions.

In FIG. 4, there will be seen a cover 401 and a compartment section 402 which are joined by threads 403. The compartment section 402 has a groove 404 for accommodating a gasket 405. When the cover 401 is properly assembled on the compartment section 402, the gasket 405 is compressed between the base 406 of the groove 404 and the anvil plane 407 of the cover 401.

Attached to the compartment section 402 by hinge pin 431 is a clamp 432 having an upper section 433 and a lower section 434 joined together by a bolt 435 which passes through a hole 436 in the upper section 433 and engages with threads 437 in the lower section 434. The end of bolt 435 may be peened to prevent full removal. The cover 401 has a rim 441 which the upper section 433 of the clamp 432 may engage. The hinge pin 431 couples the lower section 434 of the clamp 432 to flange 438 which forms a part of the compartment section 402. When the cover 401 is properly associated with the compartment section 402 and the clamp 432 positioned with the upper section 433 engaging the rim 431, the bolt 435 may be turned until it is tight and the clamp 432 is gripping the cover 401. The clamp 432 assures that the cover 401 cannot turn as a result of extreme vibration, shock or careless handling. An advantage of the clamp design is that the cover and compartment section do not need to be kept as mated pairs.

The proper location of the cover 401, with respect to the compartment section 402, could be determined by any convenient means in the factory and then the upper section 433 of the clamp 432 hooked over the rim 441 of the cover 401 and the bolt 435 tightened to bring the upper and lower section 433 of 434 together. Thereafter, the lower section 434 would be brought to the flange 438 and a hole drilled for the hinge pin 431. Thereafter, if the cover is ever removed and replaced, there will be an indication that the cover is not screwed on sufficiently if it is not possible to turn the bolt 435 and bring the upper and lower sections 433 and 434, respectively, together.

If desired, shims 439 could be used between the upper section 433 and the lower section 434 of the clamp 432. The substitution of new shims would provide for use of a new cover 401 if replacement became necessary.

As another alternate assembly, the clamp 432 could have the upper section 433 and the lower section 434 constructed of a single member with the clamp 432 coupled to the cover 401 and the compartment section 402 after the cover 401 has been placed in position by inserting a pin or bolt in place of the hinge pin 431. The described pin or bolt to replace the hinge pin 431 could not be inserted until, or unless, the cover 401 was in its proper position with respect to the compartment section 402 to assure the desired seal.

Considering now more specifically FIG. 5, there will be seen a simplified three dimensional view of the enclosure including the cover 501 and the compartment section 502 to illustrate a complete assembly. However, it should be understood that FIG. 5 constitutes an overly simplified view of the enclosure in that only one cable entrance 544 is illustrated and various strengthening ribs, hand holds, lugs, etc. have been omitted for simplicity. The bracket 512 might be part of the casting or it might be attached by welding or machine screws. Or in a practical application, the bracket 512 might be combined with a lug or other structural member.

When more than one enclosure is to be used at a given location, the enclosures should be of different sizes or have their covers 501 and the compartment sections 502 coded so that a pair of covers cannot be interchanged. That is, the adjustment for the water tight seal is individual to a matched cover 501 and compartment 502. Substitution of covers could result in a defective seal even if the slot 511 and bolt 515 are aligned.

It is believed that those skilled in the necessary arts will not have any difficulty in understanding how any of the structures of FIGS. 1 through 4 could be incorporated into the complete assembly shown in FIG. 5. FIG. 5 illustrates the embodiment shown in FIG. 1, but it should be understood that any of the embodiments shown in the other Figs. could be incorporated in the overall structure of FIG. 5.

As has already been mentioned, the assembly, including the cover 501 and compartment 502 of FIG. 5, may be subjected to a hostile environment including not only an explosive atmosphere, but also extensive moisture, perhaps even submerging the assembly, severe shock, explosion, continuous vibration and wide ranges in temperature. As already mentioned, the assembly of FIG. 4 may be used to help retain the cover 501 in position with respect to the compartment section 502 in spite of external explosion or vibration.

The bolt 113, 213 or 313 and its engagement with the slot 111, 211 or 311 will limit the possible angular excursion of the cover as a result of vibration. A lock washer (not shown) may be used to retain the bolt 113, 213 or 313 in position. If a lock washer is not sufficient, other standard and well known techniques may be used to retain the bolt against rotation in response to vibratory conditions.

Various techniques may be used within the factory for determining the original relationship between the cover and compartment section. One technique which might be used is to tighten the cover 101 until a feeler gage of a predetermined thickness just fits in the space 109. This technique would require a known relationship between the space 109 and that between the plane of the anvil 107 and the plane of the base 106 of the groove 104. Other techniques which are familiar to those skilled in the related arts could be used.

The bolt 113, 213 or 313 should have a length which permits it to enter the slot 111, 211 or 311, but not long enough to allow the end 114, 214 or 314 to contact the base of the slot 111, 211 or 311. If the bolt did contact the base of the slot, an abnormal strain might be applied to the threads 103, 203 or 303. The result could be a cocked cover and a possible loss of seal due to thread clearances being forced to one side.

Normally, some provision, such as peening, would be used to prevent full removal of the bolt 113, 213, 313 or 435. This prevents loss of the bolt and/or substitution of another which does not have the required length.

While there has been shown and described what is considered at the present to be the preferred embodiment of the invention, modifications thereto will readily occur to those skilled in the related arts. For example, a variety of pins or pivoting elements could be used in lieu of the described bolt 113, etc. It is believed that no further analysis or description is required and that the foregoing so fully reveals the gist of the present invention that those skilled in the applicable arts can adapt it to meet the exigencies of their specific requirements. It is not desired, therefore, that the invention be limited to the embodiments shown and described, and it is intended to cover in the appended claims all such modifications as fall within the true spirit and scope of the invention.

What is claimed is:

1. An enclosure for electrical equipment comprising in combination:
   a. a threaded compartment section;
   b. a cover for said compartment section having threads for mating with the threads of said compartment section;

c. gasket means, disposed for contact by parallel surfaces of said compartment section and said cover when they are in mated relationship, for providing a seal between the interior and exterior of said compartment section when said gasket is contacted by said parallel surfaces in response to relative rotation of said cover and said compartment section to engage a predetermined portion of said mating threads; and d. visually inspectable locking means engageable with and cooperating with said cover and said compartment section for severely restricting the degree of possible relation rotation between said cover and said compartment section only when said predetermined portion of said mating threads are engaged.

2. The combination as set forth in claim 1, wherein said locking means comprises first and second portions associated with said compartment section and said cover, but not necessarily, respectively, and wherein said first and second portions cooperate to limit the relative rotation of said compartment section and said cover.

3. The combination as set forth in claim 2, wherein said first and second portions have a threaded hole and a slot, respectively.

4. The combination as set forth in claim 3, wherein the longitudinal axis of said threaded hole is at right angles to the axis of the threads of said cover and said compartment section.

5. The combination as set forth in claim 4, wherein when said threaded hole and said slot are in a mating alignment, such alignment is lost in response to the movement of said slot in the direction of the axis of the threads on said cover by an amount equal to or greater than the pitch distance of the threads of said cover.

6. The combination as set forth in claim 5 and including a headed bolt for mating with said threaded hole and extending into said slot and wherein said head abuts with said first portion before the bolt contacts the base of said slot when said bolt is turned into said threaded hole.

7. The combination as set forth in claim 6 and including means for capturing said bolt in said threaded hole to prevent its complete removal therefrom.

8. The combination as set forth in claim 5 and including a threaded member for mating with said threaded hole and extending into said slot without contacting any boundary of said slot.

9. The combination as set forth in claim 2, wherein said first and second portions, when in cooperating relationship, may be secured in such relationship by a third member.

10. The combination as set forth in claim 1, wherein said locking means comprises means for determining that the distance, as measured in the direction of the axis of said threads, between a first point on said compartment section a second point on said cover is no greater than a predetermined maximum when the threads of said cover are engaged with the threads of said compartment section.

11. The combination as set forth in claim 10, wherein said locking means comprises a clamp which may be selectively adjusted to provide a predetermined maximum distance between first and second portions thereof.

12. The combination as set forth in claim 11, wherein said clamp is coupled to one of said compartment section and said cover, and engages the other of said compartment section and said cover.

13. The combination as set forth in claim 12, wherein said first and second portions of said clamp are joined by a bolt for selectively adjusting the maximum distance between said first and second portions.

14. The combination as set forth in claim 13 and including shims around said bolt and between said first and second portions for limiting the minimum distance between said first and second portions.

* * * * *